Jan. 13, 1931.  H. B. KIPPER  1,789,235
PROCESS FOR THE MANUFACTURE OF SODIUM CARBONATE
Filed May 22, 1928
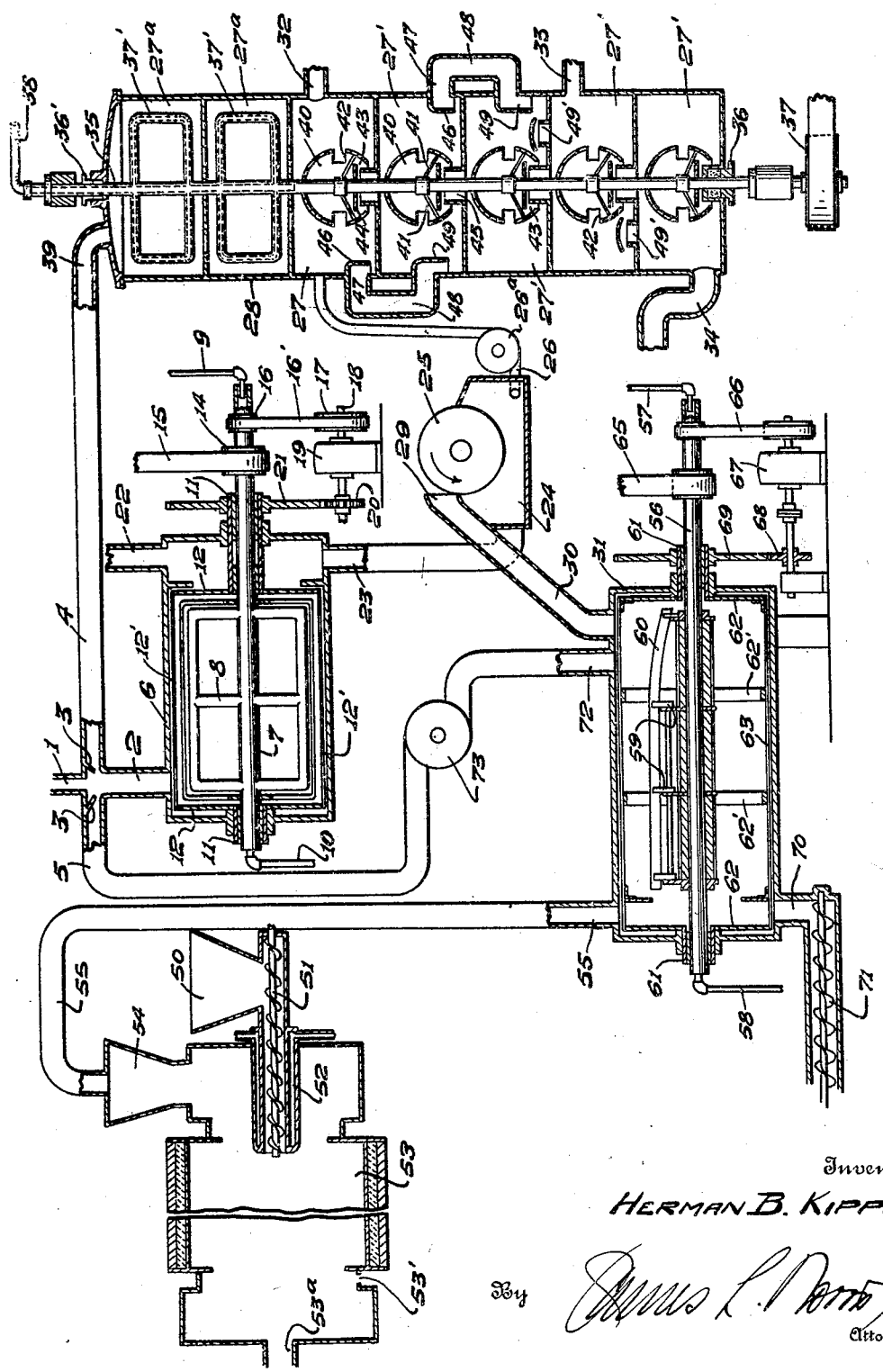
Inventor
HERMAN B. KIPPER
By
Attorney Patented Jan. 13, 1931

1,789,235

UNITED STATES PATENT OFFICE

HERMAN B. KIPPER, OF MUSKEGON, MICHIGAN

PROCESS FOR THE MANUFACTURE OF SODIUM CARBONATE

Application filed May 22, 1928. Serial No. 279,723.

The present invention relates to improvements in a process and apparatus for the production of sodium carbonate. The main object of the invention is to carry out the well known "ammonia soda reaction" for the manufacture of sodium carbonate or soda far more efficiently and in apparatus of greatly reduced size and cost.

In carrying out the present process, an apparatus has also been designed by means of which the complete process is carried out, from the introduction or charging at the inlet of the salt or sodium chloride brine after purification and saturation with ammonia gas to the delivery to and through the apparatus, so that in the final stages sodium carbonate is produced and the ammonia is re-claimed for re-utilization.

Into the salt or sodium chloride brine, after purification, ammonia and carbon dioxide are forced in apparatus described in my Patents Nos. 1,632,340 and 1,655,424, and applications Serial No. 696,485, filed March 3, 1924, Serial No. 109,149 filed May 14, 1926, and Serial No. 246,807 filed January 14, 1928, to bring about the following reaction:

No. 1. $NaCl + NH_4OH + CO_2 =$
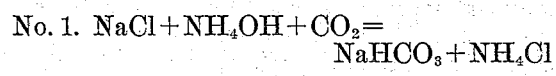
$NaHCO_3 + NH_4Cl$

The precipitated sodium hydrogen carbonate is then filtered off from the more soluble ammonium chloride, dried and calcined, or heated sufficiently high to drive off the carbon dioxide gas and water to form sodium carbonate, and according to the following equation:

No. 2. $2NaHCO_3 + \text{heat} =$
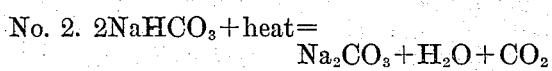
$Na_2CO_3 + H_2O + CO_2$

The ammonium chloride is decomposed with lime or calcium hydroxide, and the ammonia is recovered for re-utilization in the process, whereas the calcium chloride formed is either recovered for the market by evaporation or permitted to go to waste in solution, the formula for the same being as follows:

No. 3. $2NH_4Cl + Ca(OH)_2 =$
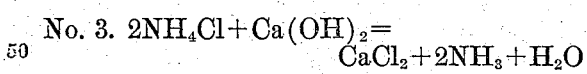
$CaCl_2 + 2NH_3 + H_2O$

The apparatus shown in the single figure of the drawing is designed to effect the reaction represented by the above formulas Nos. 1, 2 and 3 of the process and are arranged in sequence so that the three steps will be performed in sequence.

Referring to the drawing, the numeral 1 designates the charging inlet through which the salt or sodium chloride brine, after purification and saturation with ammonia gas, is charged, said inlet being directed into the supply pipe 2. Disposed at opposite sides and entering at the junction of the pipes 1 and 2 are pipes 4 and 5 containing baffles 3 inclined toward the supply pipe 2 to direct the ammonia gas and the carbon dioxide gas into the supply pipe 2, as will presently appear.

The casing 6, into which the pipe 2 leads, has mounted concentrically thereof the hollow shaft 7 carrying a cooling pipe frame 8 which is rotatable with said shaft. The frame 8 forms a cooling stirrer for the present mixing apparatus which thoroughly commingles the brine and ammonia admitted to the casing 6 to produce the sodium hydrogen carbonate and ammonium chloride, as set forth in reaction No. 1. Water for cooling the stirrer 8 is admitted to the hollow shaft 7 through the pipe 9 and discharged from the opposite end of said shaft through the pipe 10, stuffing boxes and other water-tight connections being provided to produce tight joints between the pipes 9 and 10 and the shaft 7 and permit rotation of said shafts.

Disposed concentrically about the shaft 7 and journaled for rotation at the opposite ends of the casing 6 are the two short shafts 11 which, in turn, have connected thereto the disks 12 on which are mounted beveled bars 12' which extend longitudinally of the casing 6 close to the side wall of the latter and form a scraping device which is rotated at a much slower rate, approximately one to two revolutions per minute, while the stirrer frame 8 and its shaft 7 are rotated simultaneously and at approximately 400 R. P. M., or at a speed of approximately one-half to one mile per minute. This is accomplished through the medium of the drive pulley 14 on one end of the shaft 7 and the belt 15 passing over said pulley and which is here indicative of any source of power, as an electric motor or the like, as may be deemed necessary. There is here shown a pulley 16 driven from the pulley by a belt 16'. The pulley 16 is mounted on and drives the shaft 18 upon which is mounted the speed change mechanism 19, which through the small gear 20 rotating the large gear 21 keyed to one of the short shafts 11 drives the latter at a lower speed than the shaft 17. Thus it will be seen that the shaft 17, when driven, operates also the shafts 11 and the scraping mechanism.

Extending upwardly from the top of the casing 6 is an outlet 22 for carrying off the waste gases, and also leading from the casing 6 is a conduit or pipe 23 which carries the sodium hydrogen carbonate and the ammonium chloride down into the filter 24. At this point in the process, the insoluble and precipitated sodium hydrogen carbonate is separated from the ammonium chloride in solution by rotary filter 25, the sodium hydrogen carbonates being discharged through a conduit 30 at 29, while the ammonium chloride is drawn off through pipe 26 and is forced by pump 26$^a$ into the intermediate chamber 27 of the ammonium distillation column or separator 28.

The ammonia separator is here shown as composed of a plurality of communicating superposed chambers 27 and 27', five of such chambers and a pair of superposed gas cooling chambers 27$^a$, above the same being shown in this instance, the lower gas cooling chamber 27$^a$ being in communication with the chamber 27.

At the same time that the ammonium chloride is led into the chamber 27, milk of lime is also delivered to said chamber through the pipe 32, while steam is conducted through the pipe 33 next to the lowermost chamber 27'. Although only one steam admission pipe is here shown, any number of these may be employed at various points throughout the apparatus.

Connected to the lowermost compartment 27' is a conduit 34 by means of which the calcium chloride and other matters may be discharged either as a waste solution or as a product to be saved for commercial purposes.

A shaft extends lengthwise of the distillation column 28 concentrically with the latter and is provided with stuffing boxes 36 and 36' so there can be no leakage at its point of entrance or exit from the heads of said separator. As here shown, the shaft is rotated by the pulley 37, but this may be taken as indicative of any form of power as an electric motor, or the like. The upper end of the shaft 35 is hollow and into which hollow portion a water supply pipe 38 extends. The hollow portion of the shaft 35 carries a pair of hollow stirrers 37 and 37' which rotate in the gas cooling chamber 27$^a$ and are in communication with the hollow portion of said shaft, so that the ammonia gas formed in the lower compartments and finally discharging from the uppermost gas cooling chamber 27$^a$ into the inlet end 39 of the ammonia gas conducting pipe 4 is properly cooled, and excess steam condensed, before being re-utilized by entry into the pipe 2 of the conversion apparatus 6.

Mounted in each one of the compartments 27 and 27' and attached to and rotatable with the shaft 35 is a centrifugal separating member 40 which is here shown made in the shape of a sphere open at its lower portion and supported by rods 41 extending at an inclination between the same and the shaft 35. Outlets 42 are formed in spherical members 40 at diametrically opposite points and above the supporting rods 41.

The shaft 35 extends through an opening formed in the center of the upper wall of each of the chambers 27 and 27', and a pipe 45 extends upwardly from each of said openings into the opening at the lower portion of each of the spherical members 40. A baffle 44 is mounted on the shaft 35 within each of the spherical members 40 immediately above the upper end of the pipe 45 which extends into such member. Thus steam admitted through the pipe 35 to one of the lower compartments 27 is caused to take a tortuous route during its passage upwardly to the compartment 27 where it acts upon the milk of lime and the ammonium chloride delivered to said chambers through the pipe 32 and the pump 26$^a$, respectively, to produce ammonia gas and a solution of sodium chloride. The ammonia gas ascends into the upper compartments 27$^a$ through openings in the bottoms of said chambers, and the solution of sodium chloride descends from the chamber 27 through the chambers 27' to the lowermost chamber 27'.

A pipe 48 has its opposite ends projecting respectively, through the side walls of the chamber 27 and of the chamber 27' immediately below the latter, and a second pipe 48 has its opposite ends projecting, respectively, through the side walls of the intermediate chambers 27'. Each of the pipes 48 has its upper end extending downwardly to a point adjacent the bottom wall of the chamber to which such end is connected and its lower end 49 extending downwardly toward the bottom wall of the chamber to which such end is connected. Openings 49, having upwardly projecting flanges, are formed in the upper wall of each of the two lowermost chambers 27', and baffles are mounted above said flanges.

Thus the calcium chloride solution formed in the chamber 27 passes downwardly from said chamber through the chambers 27' to the lowermost chamber 27' and from the latter through the pipe 34, but by reason of the depending upper ends 47 of the pipes 48, the upwardly extending ends of the pipes 45 and the upwardly projecting flanges of the pipes 49, the level of the liquid in each of the chambers 27 and 27', except in the lowermost chamber, is maintained above the opening in the lower ends of the spherical members 40. Therefore the rapid rotation of the spherical members 40 and the entry of steam into the openings in the lower ends of said members causes the liquid in the lower portions of the chambers 27 and 27' to be drawn into said spherical members and to be ejected by centrifugal action through the openings 42 of the latter against the walls of the several chambers.

With this apparatus, reaction No. 3 is carried out, that is, the ammonium chloride is fed or delivered to the tower or separator 28 and is there commingled with the milk of lime in the presence of steam, with a result that a solution of calcium chloride is produced at the lower end of the tower and ammonia gas is delivered into the conduit 4 at the upper end of such tower or separator, the water being carried off with the calcium chloride.

As before stated, the sodium hydrogen carbonate is directed by the pipe or conduit 30 into the converter or kiln 31, and as it is necessary to supply hot gases to this kiln to bring about the drying and decomposition of the sodium hydrogen carbonate to form sodium carbonate, carbon dioxide and water, the hot gases from the lime kilns, after being freed from dust, are directed through converter 31. Crushed limestone or a mixture of limestone and pulverized coke are fed from hopper 50 to the rotary lime kiln 53 by a feed screw 51, a portion of which screw is cooled by a water jacket 32. The kiln 53 has a lime outlet 53' and an inlet 53$^a$ for the admission of hot air or producer gas and air, in order to effect the burning of the limestone to lime. The gases formed in the kiln 53 are directed through the portion 54 and the pipe 55 into the converter 31. Thus, the hot dry gases admitted to the converter kiln 31 at one end thereof will act upon the sodium hydrogen carbonate admitted at the other end to decompose the sodium hydrogen carbonate into sodium carbonate, carbon dioxide and water. The sodium carbonate passes through outlet 70 to the feed screw delivering mechanism 71 where it may be utilized in any desired manner.

Journaled within the ends of the casing 31 and extending therethrough is a hollow water-jacketed shaft 56, the water being supplied to said jacket and carried off by the pipes 57 and 58, respectively, and beveled stirring blades 60, which extend longitudinally of the casing 31, are supported by arms extending radially from the shaft 56. A short shaft 61 surrounding the shaft 56 extends into each end of the casing 31. A disk 62 is mounted on the inner end of each of the short shafts 61 and the scraping blades 63, which are supported by reinforcing and supporting rims or rings 62' extend between said disks 62. This mechanism operates upon the same principle as the mixing mechanism 6, but is shown as of slightly different construction so that the hot gases as they enter the casing 31 are properly commingled with the sodium hydrogen carbonate within said casing in order to effect the conversion of the latter into sodium carbonate, carbon dioxide and water. The carbon dioxide gas and nitrogen are drawn off from the casting 31 through the pipe 72 by means of the blower 73, and delivered through the pipe 5 at the junction of the pipes 1 and 2. The shaft 56 and also the scraping mechanism are driven by a belt 65 which passes over a pulley on the end of the shaft 56, but, as heretofore stated, this is indicative of any mechanism, such as an electric motor and the like. The belt 66 drives through the change gear mechanism 67 the gears 68 and 69, the latter are carried by one of the short shafts 61, so that the scraping mechanism will be rotated at a considerably lower speed than the shaft 56.

From the foregoing description, it is evident that with the present apparatus a continuous process for producing sodium carbonate by utilizing the well known ammonia soda process may be carried out and that the ammonia gas will be retrieved for re-utilization and delivery at the charging point at the initial step of mixing to produce the sodium hydrogen carbonate and the ammonium chloride.

It is apparent that many forms of stirring mechanism, here shown as apparatus 6 and 31, may be employed to produce the desired result of cooling and mixing the salt or sodium chloride brine after purification and saturation with ammonia gas and treating with carbon dioxide, it being essential that the same be cooled during these mixing operations to properly cause the three to form the sodium hydrogen carbonate and the ammonium chloride. It is also apparent that any form of filtering mechanism for separating these two chemicals can be provided and that the one here shown at 25 is merely diagrammatic.

It is also apparent that counter and direct kiln operations as well as other operations described can be used with the specific advantages inherent in each.

It will also be noted that throughout this process counter current operation is described, but many changes may be employed to effect a better separation of the several chemicals to produce the final result, that is, pure sodium carbonate and ammonia gas.

It will also be noted that for step or reaction No. 1 there has also advantageously been employed the type of apparatus used for reaction No. 3, that is, the ammonia soda reactions. In this instance, the water is cooled by pipe or hollow beaters in one or more compartments and centrifugal stirring is employed in the other compartments, each kind of stirring being employed alternately or otherwise as found most effective and desirable, as it is not desired to confine the present invention to the exact mechanical features illustrated, but to the principles established by means of the same.

Although internal cooling by means of the hollow arms or stirrers is employed in the reaction cylinder used for the formation of sodium hydrogen carbonate, external cooling of the cylinder or apparatus, for instance, by means of sprays, may also be used. Similarly, the cylinder or apparatus used for decomposition of the sodium hydrogen carbonate into sodium carbonate, carbon dioxide and water may be externally heated or insulated, either externally or internally.

What is claimed is:—

1. A process for the manufacture of sodium carbonate, consisting in rapidly stirring and simultaneously cooling internally and externally a mixture of sodium chloride brine, ammonia hydrogen gas and carbon dioxide gas in a stationary vessel to precipitate sodium hydrogen carbonate and produce an ammonium chloride solution; scraping the inner surface of the vessel at a slower rate of speed than the stirring, and expelling the precipitate and ammonium chloride from said vessel; filtering the sodium hydrogen carbonate from the ammonium chloride solution; heating the sodium hydrogen carbonate with hot waste gases from a lime kiln to decompose it into sodium carbonate, carbon dioxide and steam, and recovering the sodium carbonate.

2. A process as set forth in claim 1, in which the ammonium chloride solution is decomposed with lime and steam to separate the ammonia therefrom for reintroduction into the process.

3. A step in an ammonia soda reaction process to produce sodium carbonate, consisting in rapidly stirring and simultaneously cooling internally and externally a mixture of sodium chloride brine, ammonia hydrogen gas and carbon dioxide gas in a stationary vessel to precipitate sodium hydrogen carbonate and produce an ammonia chloride solution, scraping the inner surface of the vessel, and expelling the precipitant and ammonium chloride from said vessel.

In testimony whereof I have hereunto set my hand.

HERMAN B. KIPPER.